US008646012B2

(12) United States Patent
Rouse et al.

(10) Patent No.: US 8,646,012 B2
(45) Date of Patent: Feb. 4, 2014

(54) SYSTEM AND METHOD OF MAPPING CUSTOMER PREMISE EQUIPMENT IN A VOD SYSTEM OF A CABLE SERVICE PROVIDER

(75) Inventors: Alan Rouse, Lawrenceville, GA (US); Charles Dasher, Lawrenceville, GA (US)

(73) Assignee: Ericsson Television Inc, Duluth, GA (US)

( * ) Notice: Subject to any disclaimer, the term of this patent is extended or adjusted under 35 U.S.C. 154(b) by 378 days.

(21) Appl. No.: 12/898,912

(22) Filed: Oct. 6, 2010

(65) Prior Publication Data
US 2011/0191811 A1    Aug. 4, 2011

Related U.S. Application Data

(60) Provisional application No. 61/300,618, filed on Feb. 2, 2010.

(51) Int. Cl.
*H04N 7/173* (2011.01)

(52) U.S. Cl.
USPC .................. 725/93; 725/86; 725/87; 725/88; 725/89; 725/90; 725/91; 725/92; 725/94; 725/95; 725/96; 725/97; 725/98; 725/99; 725/100; 725/101; 725/102; 725/103; 725/104; 348/14.01; 348/14.02; 348/14.03; 348/14.04; 348/14.05; 386/200; 386/239; 455/39; 455/437; 455/438; 455/439; 709/201; 709/202; 709/203; 709/227; 709/228; 709/229

(58) Field of Classification Search
None
See application file for complete search history.

(56) References Cited

U.S. PATENT DOCUMENTS

| | | | |
|---|---|---|---|
| 7,065,778 B1 * | 6/2006 | Lu | 725/98 |
| 7,080,400 B1 * | 7/2006 | Navar | 725/139 |
| 7,100,192 B1 * | 8/2006 | Igawa et al. | 725/112 |
| 7,707,608 B2 * | 4/2010 | Gordon et al. | 725/54 |
| 8,037,501 B2 * | 10/2011 | Greene et al. | 725/86 |
| 8,239,446 B2 * | 8/2012 | Navar et al. | 709/203 |
| 8,316,133 B2 * | 11/2012 | Koshiba | 709/227 |
| 2003/0074660 A1 * | 4/2003 | McCormack et al. | 725/2 |
| 2005/0068969 A1 * | 3/2005 | Park et al. | 370/400 |
| 2007/0216761 A1 * | 9/2007 | Gronner et al. | 348/14.02 |
| 2008/0084867 A1 * | 4/2008 | Foti et al. | 370/352 |
| 2008/0263610 A1 * | 10/2008 | Murray et al. | 725/110 |
| 2009/0235319 A1 * | 9/2009 | Mao et al. | 725/93 |

* cited by examiner

*Primary Examiner* — Nasser Goodarzi
*Assistant Examiner* — Paul Graham

(57) ABSTRACT

A system, method, and web-based application platform enabling a television viewer to utilize an Internet device to request a Video-On-Demand (VOD) server to stream a selected video to the viewer's Set Top Box (STB). An Internet Protocol (IP) connection is established between the Internet device and an application executing at a web site, and an Internet device identifier is passed to the application. The application communicates with the VOD server to obtain a listing of available videos, and provides the listing to the Internet device. When the viewer selects a video, the application accesses an equipment-mapping table, which associates the Internet device identifier with an STB identifier. The application then sends the STB identifier and a request for the selected video to the VOD server, which delivers the video to the STB over a television delivery system.

22 Claims, 14 Drawing Sheets

SYSTEM AND METHOD OF MAPPING CUSTOMER PREMISE EQUIPMENT IN A VOD SYSTEM OF A CABLE SERVICE PROVIDER

CROSS-REFERENCE TO RELATED APPLICATIONS

This application claims the benefit of U.S. Provisional Application No. 61/300,618 filed Feb. 2, 2010, the disclosure of which is incorporated herein in its entirety.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to communications networks. More particularly, and not by way of limitation, the present invention is directed to a system and method of mapping customer premise equipment in a Video-On-Demand (VOD) television system of a cable service provider (CSP).

Cable service providers typically provide video services to their customers using a set top box (STB). The STB provides various functions and can facilitate providing various services. For example, the STB can be used to decrypt programming information or authorize access to premium channels to a user, record programs (e.g., incorporate digital video recording technology), and allow more sophisticated services to be offered.

One such service is VOD. VOD is a service where users can select to view a program, typically a movie, which is stored in a VOD Server in the cable service provider's network (or it otherwise accessible). A VOD service provides a convenient capability which allows subscribers to watch a program based on their convenience, as opposed to having to adjust their schedule for viewing broadcast programming. Typically, the VOD service is invoked by the viewer using a remote control, which causes an application to be executed in the STB. One of the capabilities provided by the STB application is prompting the user with a menu of movie selections, which the viewer can navigate and select.

Typically, the user-interface of the VOD application in the STB is rather limited. These are attributable to several reasons. First, the STB units, which are typically owned by the cable service provider, may not incorporate the fastest, latest, or most flexible processing technology. For business reasons, the deployed STB is utilized as long as possible by the cable service provider. Second, while it is possible to distribute new software applications to the STB, the ability to provide a flexible user-interface is still limited. The processing capabilities of the STB are simply not robust enough to provide a rich set of features or a flexible user-interface to viewers.

Cable service providers would like to offer a richer user interface for VOD as well as other services, but using an STB presents some inherent limitations. Thus, there is needed a more flexible approach for allowing users to interact with cable services, including VOD services.

SUMMARY

The present invention is a system and method for enabling a cable system viewer to interact with various cable-oriented services by using a conventional Internet device to interact with an application platform for communicating with a cable service provider.

In one embodiment, the present invention is directed to a method of enabling a television viewer to utilize an Internet device to request a Video-On-Demand (VOD) server to stream a selected video to a customer premises equipment. The method includes the steps of establishing an Internet Protocol (IP) connection between the Internet device and an application executing at a web site, the application being in communication with the VOD server to obtain a listing of available videos, wherein the step of establishing the IP connection includes providing an Internet device identifier to the application. The method also includes providing the Internet device with access to the listing of available videos through the IP connection; receiving at the application from the Internet device, an indication of the selected video; accessing by the application, an equipment-mapping table associating the Internet device identifier with an identifier of the customer premise equipment; and sending a request for the selected video from the application to the VOD server, the request including the identifier of the customer premise equipment.

In another embodiment, the present invention is directed to an application platform at a web site for enabling a television viewer to utilize an Internet device to request a VOD server to stream a selected video to a customer premises equipment. The application platform includes a processor and a memory; an equipment-mapping table associating an identifier of the Internet device with an identifier of the customer premises equipment; and an application stored in the memory. When the application is executed by the processor, the application platform performs the steps of establishing an IP connection with the Internet device and obtaining the Internet device identifier; obtaining from the VOD server, a listing of available videos; providing the Internet device with access to the listing of available videos through the IP connection; receiving at the application from the Internet device, an indication of the selected video; and sending a request for the selected video from the application to the VOD server, the request including the identifier of the customer premises equipment.

In another embodiment, the present invention is directed to a system for enabling a television viewer to request over the Internet, a selected video to be delivered over a television delivery system. The system includes, an STB at the viewer's premises for receiving the selected video over the television delivery system; an Internet device connected to the Internet at the viewer's premises, the Internet device including an Internet device identifier; an application executing on a processor at a web site, the application in communication with the Internet device through an IP connection; an equipment-mapping table in communication with the application, the equipment-mapping table associating the Internet device identifier with an identifier of the STB at the viewer's premises; and a VOD server in communication with the application. The Internet device includes means for sending indications of viewer inputs to the application. The application includes means for obtaining the Internet device identifier through the IP connection; means for obtaining a listing of available videos from the VOD server and providing the listing to the Internet device; means for receiving from the Internet device, an indication of the selected video; means for accessing the equipment-mapping table with the Internet device identifier to obtain the STB identifier; and means for sending the indication of the selected video and the STB identifier to the VOD server. The VOD server includes means for sending the selected video to the STB over the television delivery system.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Currently, there are two common types of networks that are capable of providing interactive video. In one type of network, cable systems utilize a hierarchical network architecture using a Hybrid Fiber Coaxial (HFC) network to deliver VOD services. These services are characterized by relatively long viewing times of the video. Specifically, the viewer may interact with the service provider for a brief time to select a movie, but the majority of time is then spent on viewing the movie. Furthermore, the viewer is desirous of an optimal viewing experience. Thus, viewers may use a large display size television to present a High Definition (HD) image to provide the highest quality viewing experience. Cable networks excel at delivering video, particularly high definition video. In addition, television manufacturers are constantly improving the quality and size of their displays to enhance the viewing experience.

The other network frequently used for viewing interactive video is the Internet. This infrastructure excels at providing an easy to use graphical user interface for selecting videos and can be readily adapted for a variety of services that incorporate video. Internet components, such as protocols used, are defined to facilitate a flexible, upgradable infrastructure. Thus, viewers can select from a large number of applications and movie programs, typically many more than are available via a cable service provider's VOD services. However, the Internet is not optimized to present video, and in particular, to stream HD video. The viewing devices (e.g., laptops, cell phones, etc.) typically have small size displays and do not have optimized hardware for presenting video.

The platforms and infrastructure for providing a video in a cable system is vastly different compared to the Internet. While cable systems excel at providing an excellent viewing experience, the Internet excels at providing flexibility for viewers to control and select one of a plurality of videos. One aspect of the present invention is to combine the two capabilities in such a way that the Internet can be used to control the delivery experience of a cable system viewer for selecting and controlling the video program and using the cable network for the actual delivery of the video itself.

Figure 1:
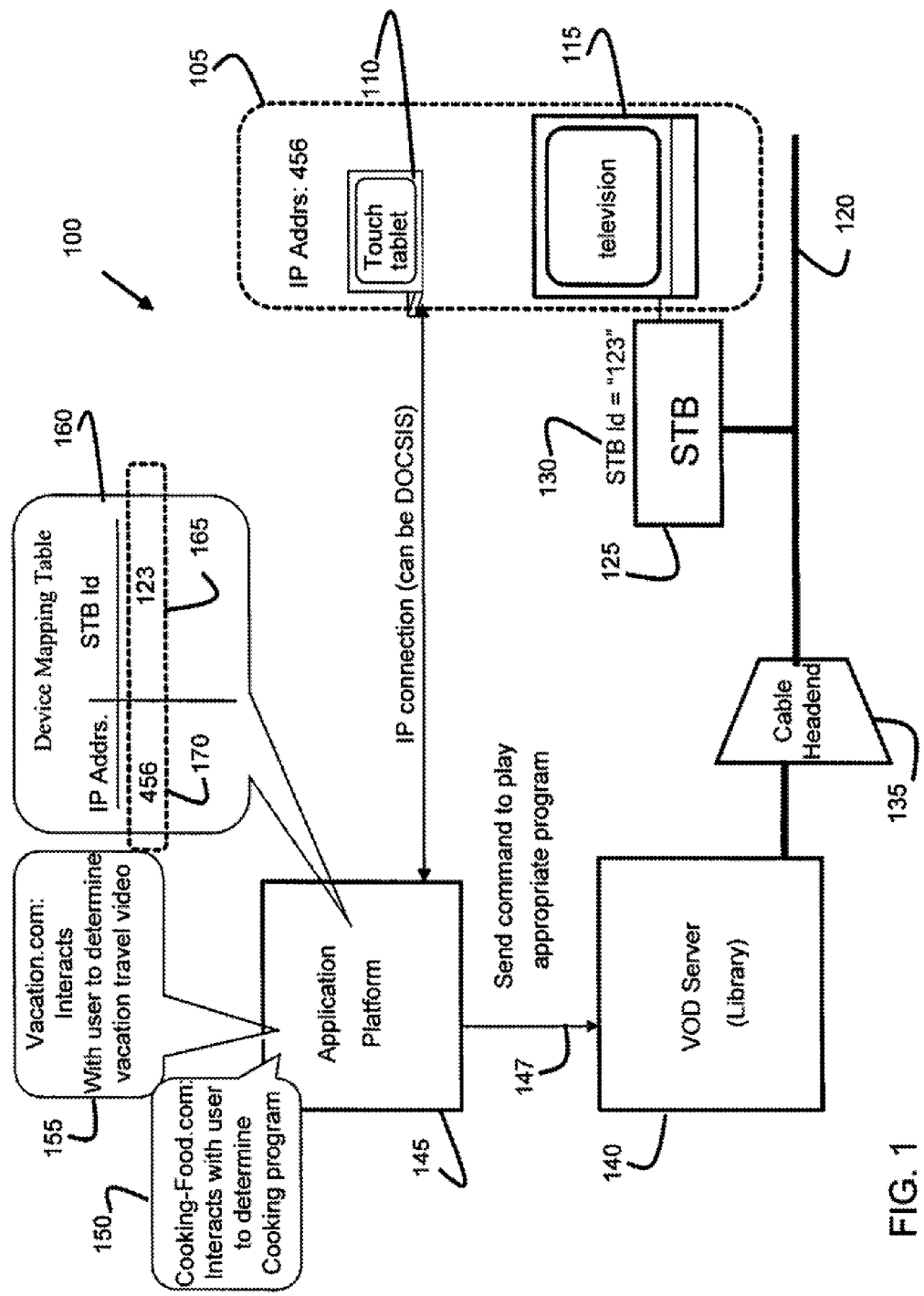
FIG. 1 is a simplified block diagram illustrating a system providing flexible user interaction for selecting a VOD program or having a VOD program recommended to a viewer.

The present invention is a system and method of mapping customer premise equipment in a VOD system of a CSP. FIG. 1 is a simplified block diagram illustrating a system 100 providing flexible user interaction for selecting a VOD program or having a VOD program recommended to a viewer in one embodiment of the present invention. In FIG. 1, a viewer has a television 115 that is connected to a STB 125 in a conventional manner. The STB communicates over a cable or HFC distribution network 120, of which only a portion or simplified representation is shown. The network 120 leads back to a cable headend 135, which include QAM modulators, transcoders, add/drop multiplexors, etc.

A VOD Server 140, which can be viewed as a movie library or a repository of video assets that can be requested on a demand basis, is able to stream a selected video asset to the cable headend. The video, in turn, is unicast (e.g., transmitted on a specific channel for the viewer on an on-demand basis). Typically, in order to receive a VOD program, the user invokes an application in the STB that provides a menu function that displays a list of movies which the user can select one for viewing. The selection is provided to the cable headend, and to various VOD related systems which then instruct the VOD Server to then stream the movie to the viewer on a selected channel. The STB is instructed to tune to that channel. The viewer can then seamlessly view the program. Not all the system components are shown in the simplified diagram of FIG. 1. For purposes of illustration, the functionality of the other VOD related systems and/or cable systems can be variously included in the VOD Server 140 and/or the Cable Headend 135.

The STB is typically manufactured with a numerical identifier, which can be a manufacturer's determined serial number, MAC address, or some other unique identifier used by the cable headend to distinguish that STB. This identifier 130 is illustrated on a simplified basis in FIG. 1 as STB Identification (ID)="123." For purposes of illustration, the STB identifier is a numerical value=123, but which in reality is typically a longer numerical or alphanumerical value to accommodate a large population of STBs. The cable service provider typically maintains a table that maps the STB identifier (STB ID) with a customer account. Consequently, the cable service provider can readily ascertain service or subscription levels for the viewer, as well as maintain viewer history and viewing preference information.

The viewer can also operate and control an Internet based device 110, which is illustrated herein as a 'touch-tablet', but which can be any portable or non-portable device. The device may be a smart phone (e.g., one with a web browser of some form), a laptop or desktop computer with Internet capability. The exact form of the device can vary, and still conform to the scope of the invention. In some embodiments, discussed below, the functionality can be integrated with the television.

The illustration of the dotted line 105 represents that the viewer of the television 115 is the same individual that is operating the touch-tablet 110. Thus, both devices are typically located in the same service household, and more specifically, are in the same room of the house.

In this embodiment, the touch-tablet 110 has an Internet connection, to an Application Platform 145. The Internet connection can be of various forms. In one embodiment, the Internet connection may be provided wirelessly. The illustration of a line between the touch-tablet 110 and the Application Platform 145 does not limit the Internet connection to a wired type of connection (e.g., telephone dialup, telephone-based Digital Subscriber Line (DSL), or Data Over Cable Service Interface Specification (DOCSIS)-based connection). In another embodiment, a DOCSIS modem may be used to interface the touch-tablet to the viewer's cable wiring (see FIG. 11).

Regardless of the Internet access method used, the viewer is afforded with the ability to establish an Internet connection to a website, which in one embodiment is operating in the Application Platform 145. The Application Platform can identify the Internet device in numerous ways. For example, the Application Platform may use the originating Media Access Control (MAC) layer address, which uniquely identifies the physical device. At boot up, the device normally uses one of the Dynamic Host Configuration Protocol (DHCP) processes defined for receiving an Internet Protocol (IP) address, which identifies the device using the IP addressing. Thus, the Application Platform 145 (which is operated by the IP service provider) is able to ascertain the identity of the user. Thus, the Application Platform is able to ascertain subscription and service levels, and may maintain web page viewing and history information of the user of the touch tablet. The choice of method for internet device identification/authentication is a design choice depending upon system configuration. Since IP addresses may change from time to time, address databases must be kept up to date in order to properly establish the mapping. Also, many devices may be behind NAT firewalls, which will provide the devices with IP addresses that are not globally unique. Since the MAC address uniquely identifies the physical device, other databases associating the physical device with the user may be utilized to perform the mapping.

Device identity may also be established using a digital certificate installed, for example, during device registration. The device presents its public certificate as its identity. The authenticating server may then present one or more challenges to the device, which the device must answer correctly to prove that the device possesses the corresponding private digital certificate. The authenticating server then verifies signatures on the public certificate from a trusted certifying authority to ensure that the device is authorized on the network. This authentication may be performed using a standard protocol such as the Transport Layer Security (TLS) or Secure Sockets Layer (SSL) protocol.

The touch-tablet user may be presented with a default home page, or may access a particular web page as a home page. Two exemplary Applications 150 and 155 found in the hosted web server, are shown as being hosted in the Application Platform 145 and can be accessed by the viewer. Those skilled in the art will readily recognize that other systems may host the applications, and may be accessed using well known Internet based communication methods.

In this embodiment, the Application Platform 145 can be owned, operated, and controlled by the CSP. However, various other arrangements are possible and within the scope of the invention, as will be discussed further. As shown in FIG. 1, the Application Platform hosts two websites, or Applications. For purposes of illustration, one Application can be called the "Cooking-Food.com" website ("Cooking website" or "Cooking Application") and the other is called "Vacation.com" ("Vacation website" or "Vacation Application") For illustrative purposes only, that the Cooking Application pertains, for example, to different ways of cooking food, recipes, techniques, products, etc. In addition, the Vacation Application offers information about vacation locations, traveling tips, vacation services that can be purchased, etc. Nothing precludes the websites or Applications from providing video information, but as disclosed herein, the websites function to direct the playing of a video to the viewer over the cable system, and thus provide the user with a more sophisticated interface for CSP-based video selection or recommend a video to the viewer.

A website interacts with the viewer via the touch-tablet, and can interact with the VOD Server to ascertain what videos are available to be played to the viewer, issue commands to play a video or a segment thereof, as well as invoke "trick commands" as appropriate to control the playing of a program. "Trick commands" include commands that are similar in function to those found on a playback device (e.g., a Video Cassette Recorder (VCR)), such as "play", "stop", "resume", "fast forward", "slow motion", and "rewind." An application program interface ("API") 147 is defined that allows the Application Platform to interact with the VOD Server. A list of possible commands/requests that may be exchanged and their purpose are defined in Table 1.

In order for an API between the Application Platform and the VOD Server to refer to the same viewer, an Equipment-Mapping Table (EMT) is required to be established and maintained. The EMT allows the IP address of the touch tablet (the viewer's IP-base device) to be associated with the viewer's STB identifier. This table then provides information as to the set of cable equipment 105 that is operated by a single viewer. In one embodiment, the EMT 160 comprises a STB identifier 165 (shown as "123" associated with an IP address 170 (shown as "456"). Thus; if the IP identifier is known for the touch tablet device 110, then the STB identifier can be determined for that viewer. Conversely, if the STB ID (or other device identifier) is known, then the corresponding IP address can be determined.

Figure 5A:
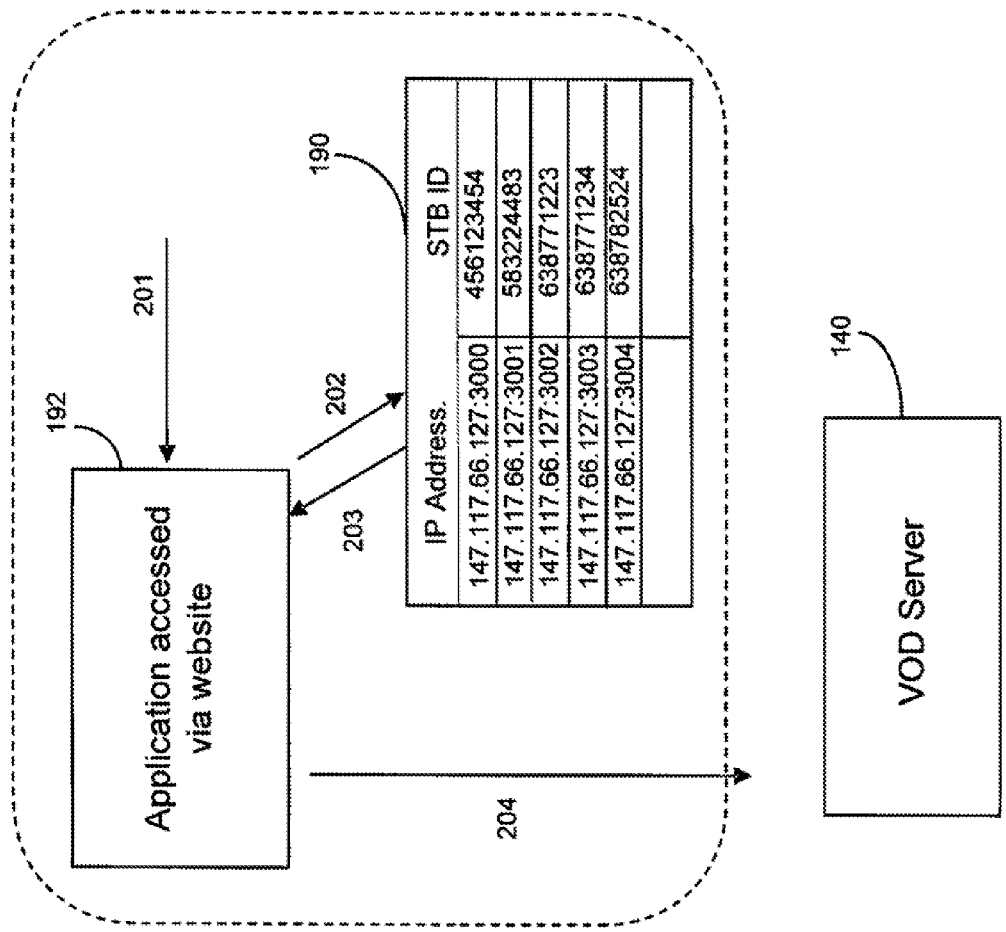
FIG. 5A is a simplified block diagram illustrating an Equipment-Mapping Table maintained in an Application.
Figure 5B:
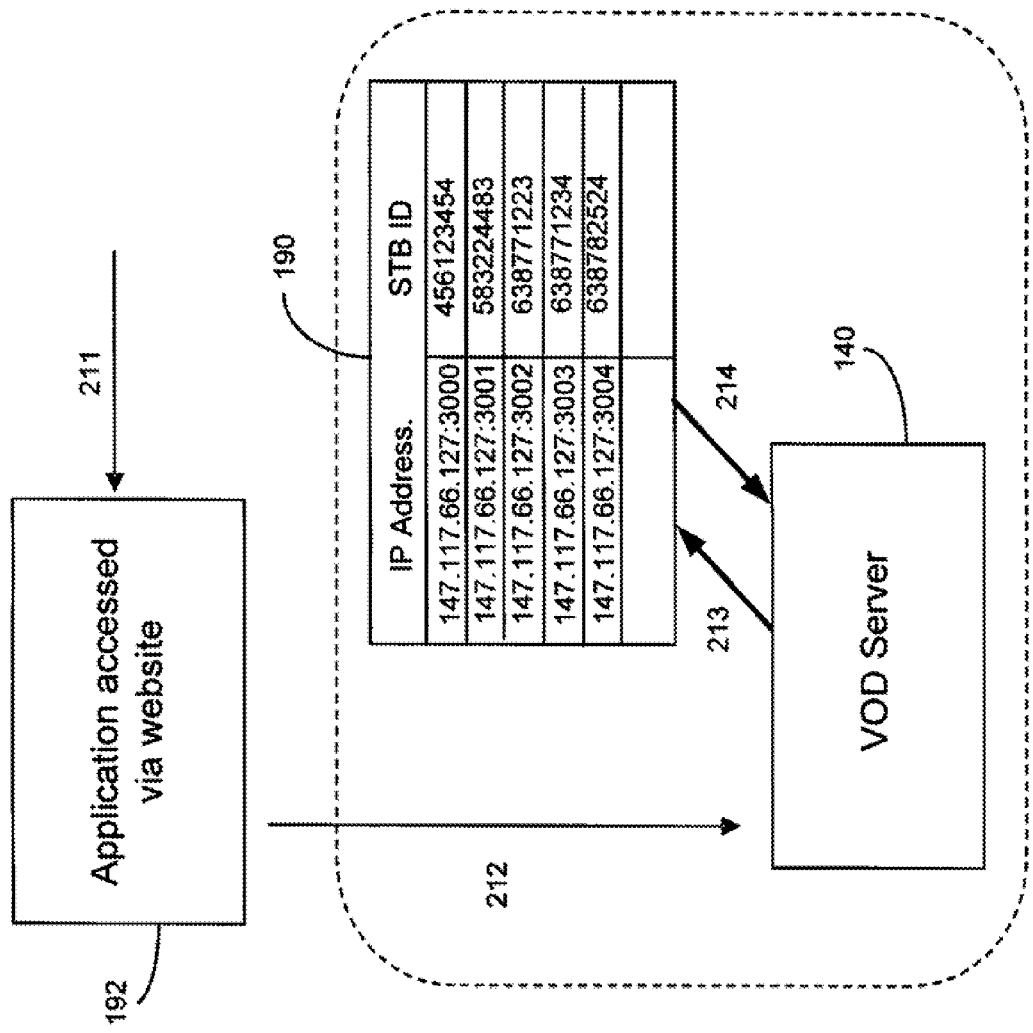
FIG. 5B is a simplified block diagram illustrating the Equipment-Mapping Table within the VOD Server.

The EMT may be stored either in the VOD Server, the Application Platform, or in a third entity, that can be accessed by the Application Platform and/or VOD Server. Various embodiments are illustrated in FIG. 5A and FIG. 5B. FIG. 5A is a simplified block diagram illustrating an EMT 190 maintained in an Application 192. In FIG. 5A, the EMT table is shown as implemented in the same system as the Application 192 executing in a server hosting the website. The Application in the website receives information from the user which indicates which movie to select in step 201. The Application, in step 202 queries the EMT table using the IP address to lookup the STB identifier. In step 203, the EMT table provides the STB identifier. Next, in step 204, the Application may request the VOD Server to provide the indicated movie to the identified STB.

FIG. 5B is a simplified block diagram illustrating the EMT table within the VOD Server 140. In FIG. 5B, the EMT table 190 is implemented with the VOD Server 140. The Application 192 receives the user's indication of which movie to view in step 211. The Application then informs the VOD Server of the IP address in step 212. In step 213, the VOD Server accesses the EMT table so as to look up the associated STB identifier. In step 214, the VOD Server receives a response. In this manner, the VOD Server can then fulfill the movie request by streaming the movie to the STB. It should be noted that the EMT table can be structured in various ways, including in this embodiment being indexed by the IP Address. In the embodiment illustrated in FIG. 1, the EMT is located in the Application Platform.

The EMT typically stores a plurality of values, and can store all the STB identifiers in a cable system. Frequently, a household may have more than one STB, and thus a viewer may have multiple STBs. In this case, a mechanism may be defined to associate, perhaps dynamically, a particular Internet device such as the touch tablet, with a particular STB identifier. In another embodiment, a viewer may use a portable device in various rooms of a house having different STBs (e.g., the living room or a den). Thus, a viewer may use the system with different STB at different times. If there is a single STB, then a single mapping in the table is sufficient. If there are multiple STB, then the appropriate STB to select may be determined by which STB is ON, or by an explicit mapping previously established (e.g., a cell phone device may be mapped for a single STB).

If the EMT is maintained in the Application Platform, then interactions with the touch-tablet are used to determine the STB Identification to use in sending a command over the API to the VOD Server. For example, in one embodiment the Application may prompt the user for different STB identifiers, and ask the user to define a room in which each is located. In this manner, the Application knows which STB identification is located in which location of the house. If the EMT is maintained in the VOD Server, then the Application Platform may send commands over the API to the VOD Server using an IP (or MAC address) and the VOD Server may then map the IP address to the appropriate STB identifier. This may be based on information provided by the customer when the STB was originally registered or obtained from the CSP.

Figure 2:
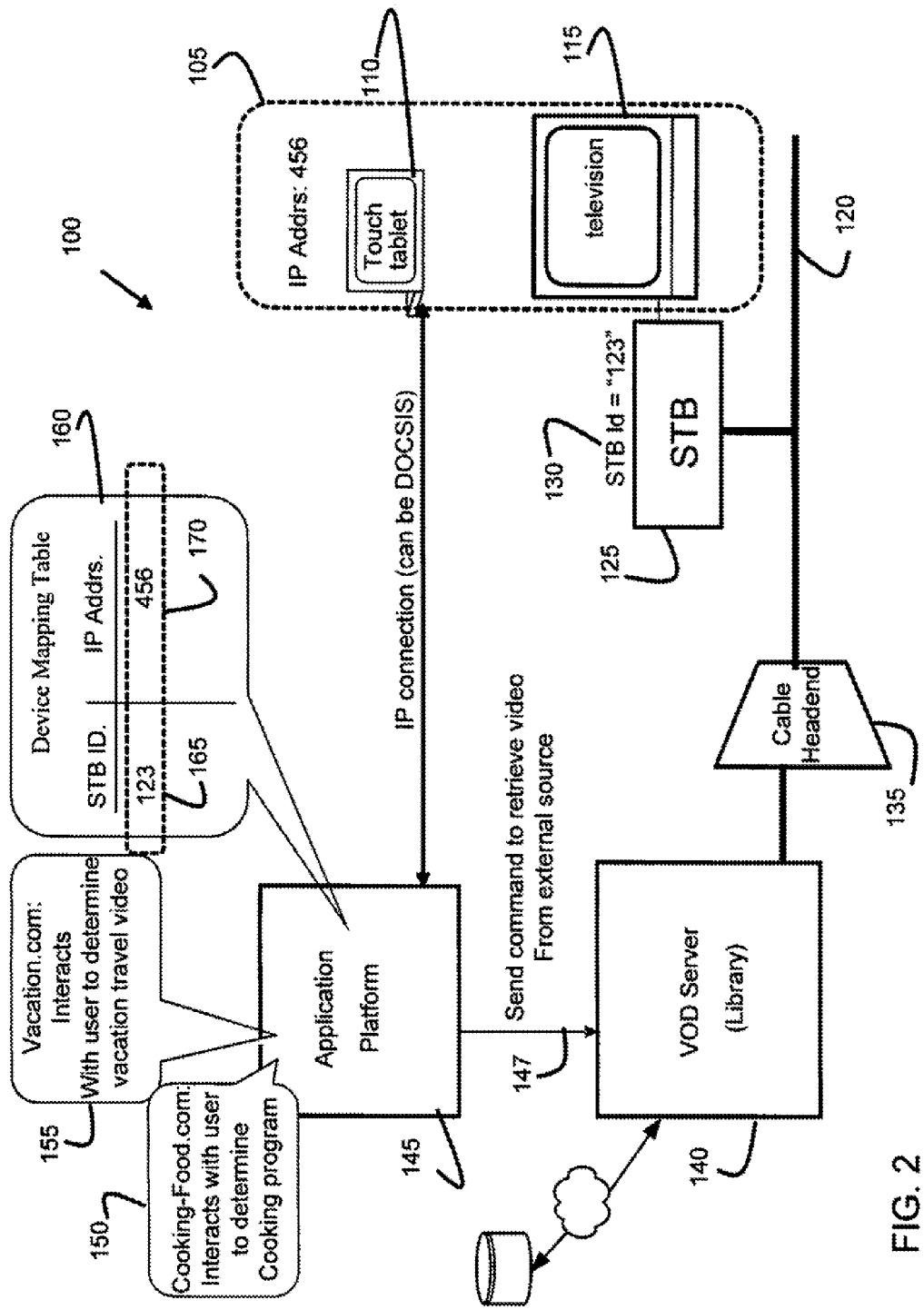
FIG. 2 is a simplified block diagram illustrating the system where the VOD Server obtains the video program from an external data source.

The discussion above focused on how the Application Platform can control the VOD system using non-conventional means. The Application Platform may also be the source of the video that can be streamed to the viewer. In another embodiment, the Application Platform may inform the VOD Server as to where the video to be streamed is located. In this embodiment, the Application Platform identifies the video, typically via a URL, or a URL with an index pointer (for identifying a segment of the video) and informs or commands the VOD Server to obtain and stream the video to the identified STB. FIG. 2 is a simplified block diagram illustrating the VOD Server 140 obtaining a video program from an external data source 148. The Application Platform 145 knows of the URL for a video asset to be streamed to a particular STB 125 and instructs the VOD Server as to the video's location. The Application Platform may inform the VOD Server so that the VOD Server can pre-fetch the video information (which is necessary if the communication facilities to that remote database are not sufficiently fast enough to support real time streaming to the viewer). In this case, the video information is transferred and stored (e.g., cached) in memory within the VOD Server until a command is received from the Application to stream the video to the STB. Otherwise, if the communication facilities between the VOD Server and the database are sufficient to support real time transfer, the VOD Server can obtain the video information in response to a command to stream the video to the viewer.

The ability of an application, embodied in a website hosted by the Application Platform, allows flexible definition of new services to be provided to the viewer with minimal impact on existing cable service VOD infrastructure. A few applications are disclosed herein and the principles of the present invention are not limited to the applications disclosed.

Existing VOD menus are typically limited by the operating system software and the VOD application software present in a STB as well as the hardware in the STB. Thus, VOD menus are typically not very flexible in the user-interface. Thus, the ability to offer flexible movie searching is limited. Furthermore, because the VOD menus are often defined or distributed by the STB manufacturer, the VOD application that is downloaded to each of the STB and the same VOD menu structure exists for all users. Thus, the VOD menu structure is designed to be used by unsophisticated users as well as experienced users. In addition, because this application is typically created by the STB manufacturer, as opposed to a third party, it is simply not possible, nor practical, to rely on an independent software developer to customize the VOD menu for various subsets of users in a cable system.

Figure 3:
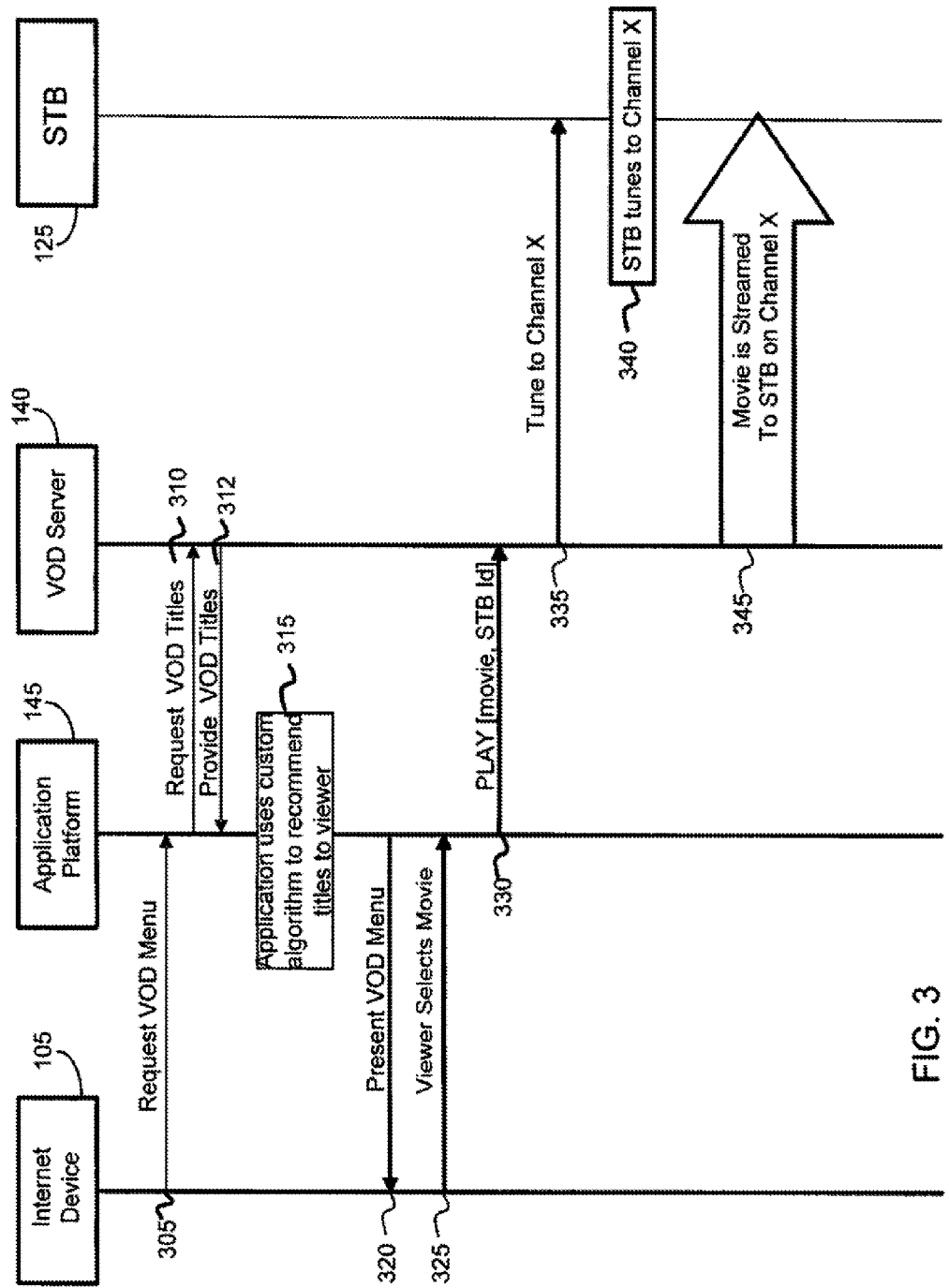
FIG. 3 is a signaling diagram illustrating interactive messaging between the components of FIG. 1 in one embodiment of the present invention.

FIG. 3 is a signaling diagram illustrating interactive messaging between the components of FIG. 1 in one embodiment of the present invention. In this embodiment, the Internet Device 105 (e.g., touch tablet), the Application Platform 145, VOD Server 140, and the STB 125 are shown as four devices communicating with each other. Although the Internet Device and the STB are on opposite ends of FIG. 1, they may be co-located in the viewer's serving location. The exact structure and number of messages may be different in various embodiments.

First, in step 305, the viewer accesses a website that provides an enhanced VOD menu. This VOD menu may be accessed using well known Internet protocols. There may be various steps not shown, such the users identifying themselves, selecting various pages in the website, etc. The Application may then request a list of VOD titles from the VOD Server in step 310. The VOD Server can respond with titles where are available for that viewer in that cable system in 312. The Application Platform may have used the EMT table to identify the STB, and the VOD Server may have determined, based on the viewer's service level, which titles are available to that viewer. For example, restrictions in the CSP may limit the rating of movies which can be selected and streamed to the viewer.

Figure 7:
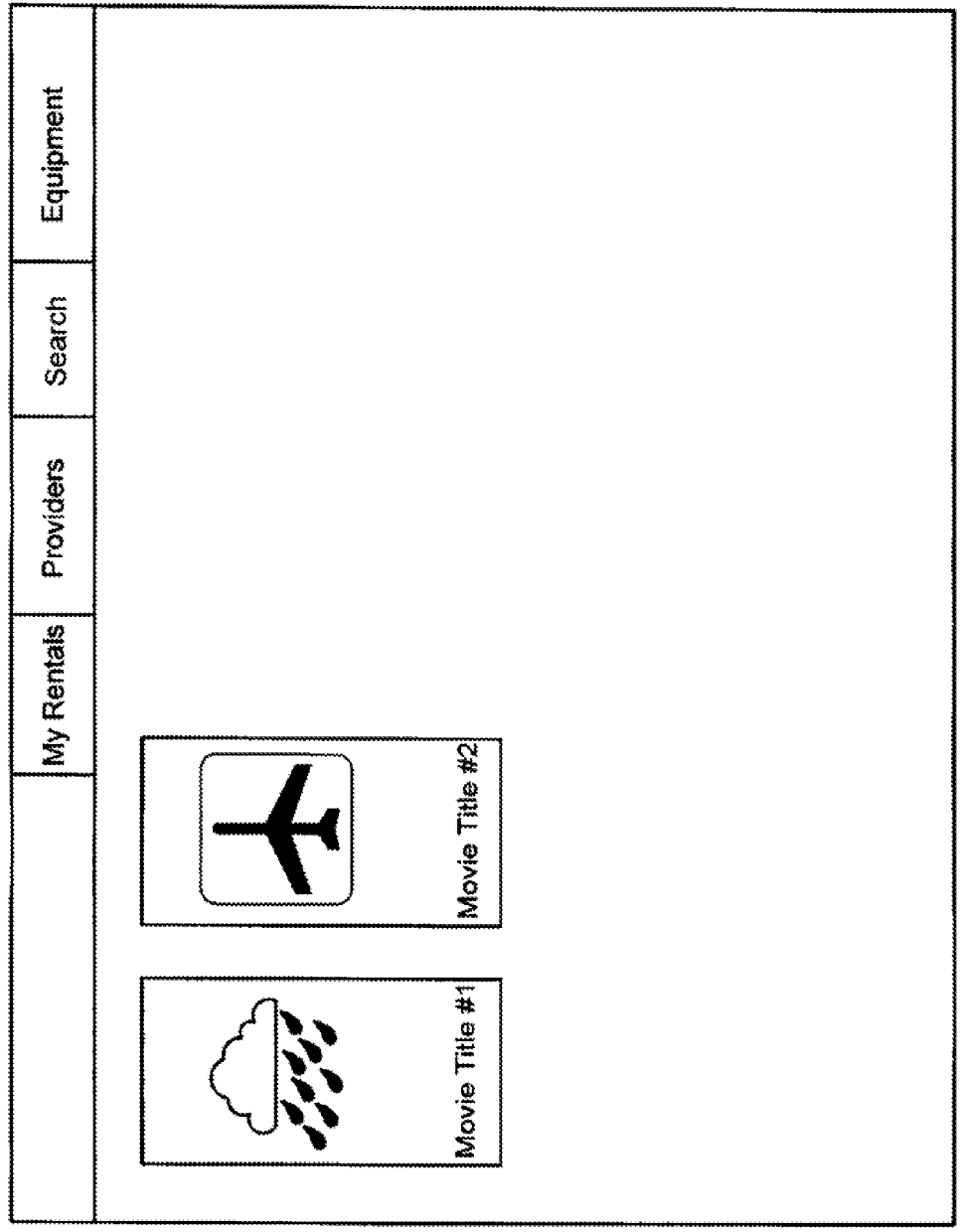
FIG. 7 illustrates a screen shot of a user-interface presented to the user.
Figure 8:
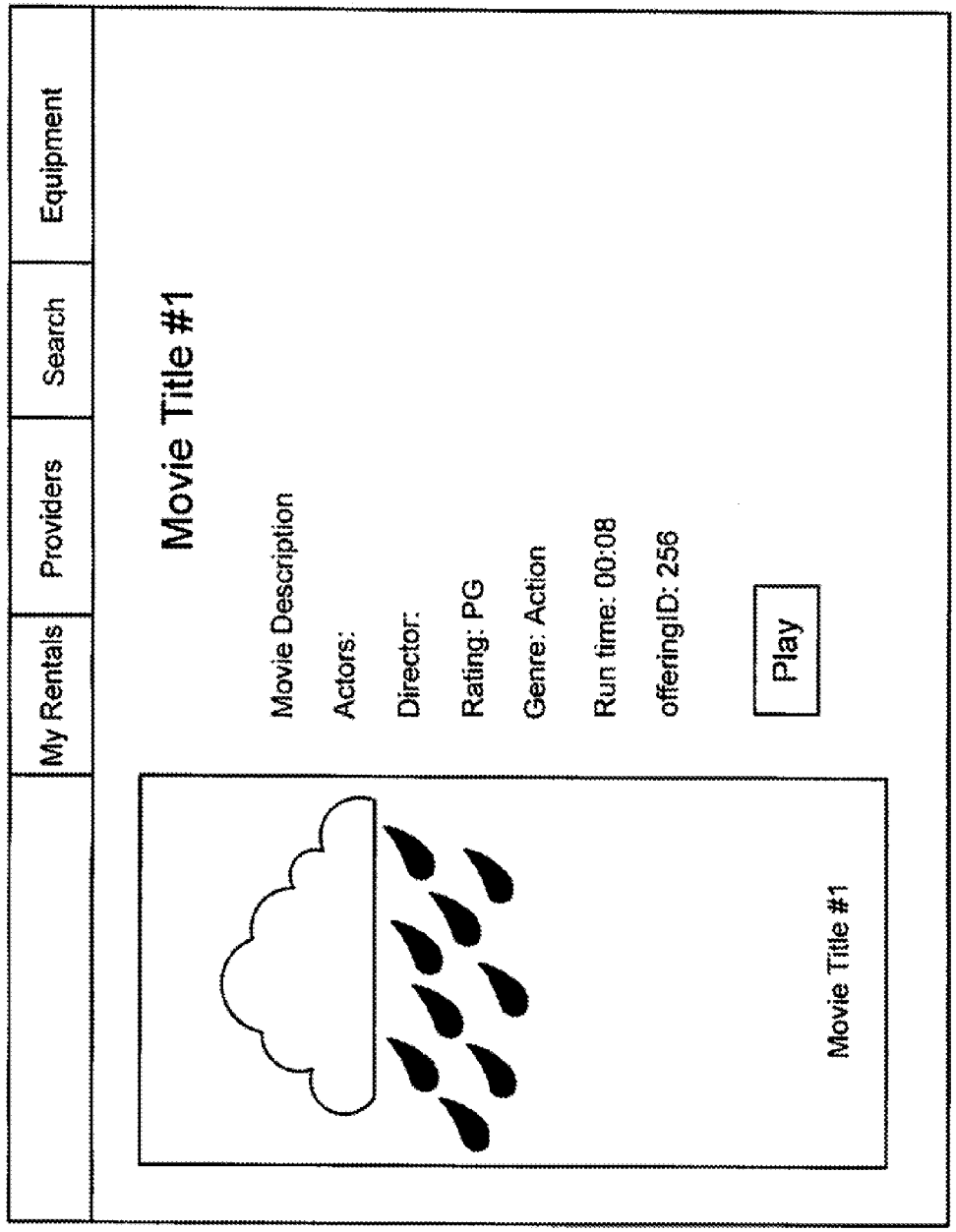
FIG. 8 is a screen shot providing details of a selected VOD movie.
Figure 9:
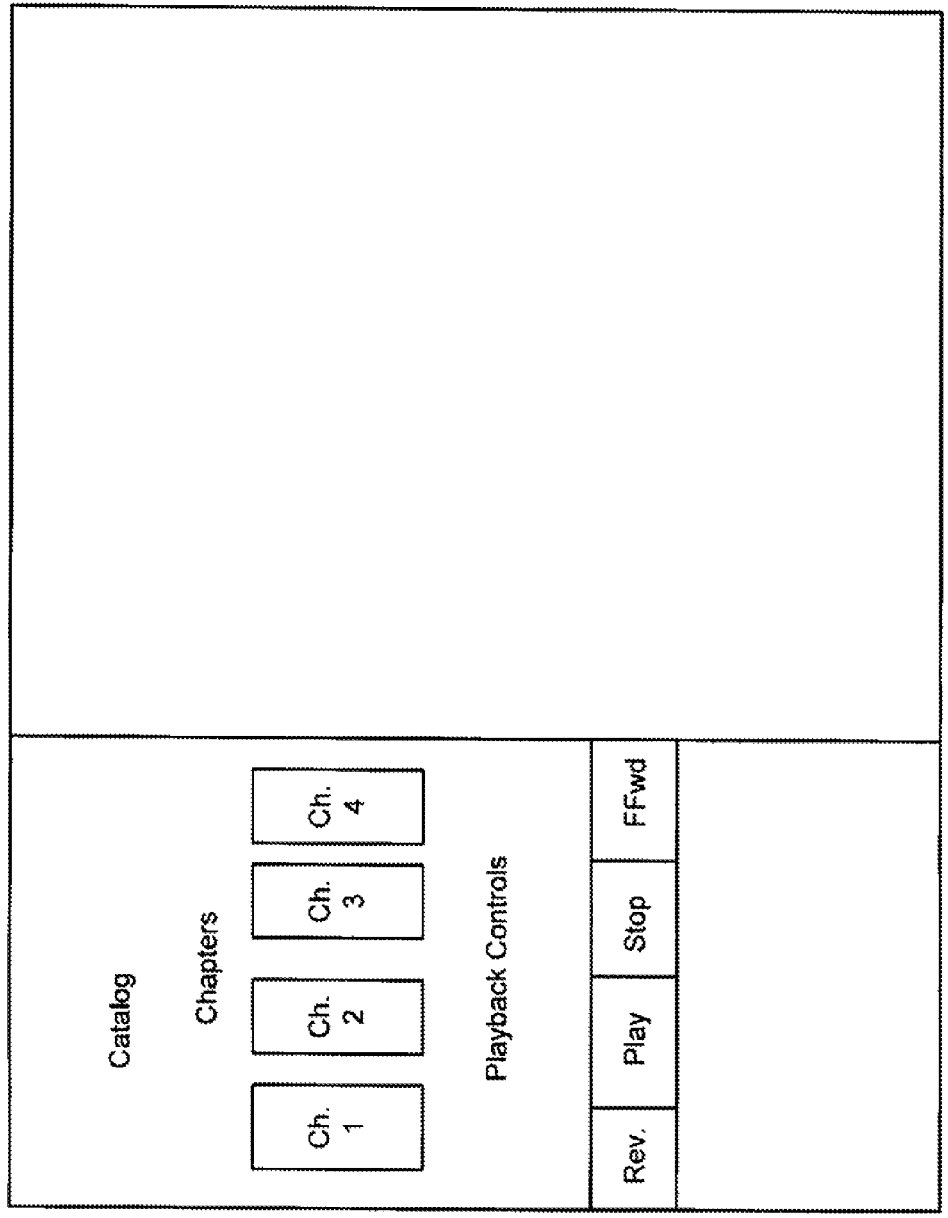
FIG. 9 is a screen shot illustrating playback controls for a VOD movie.

Next, the Application Platform in step 315 may use a variety of algorithms to interact with the viewer. These can include presenting static thumbnail images of movie posters, movie summaries, etc. (See, e.g., FIG. 7.) The Application Platform may access the viewer's viewing history and new releases to formulate a VOD menu which is presented to the Internet device 105 in step 320. The viewer than select the movie in step 325. The viewer interaction occurs using the Internet Device and can be, potentially, customized for that viewer 330. Several potential embodiments of the user-interface are illustrated in FIGS. 7 and 8. FIG. 7 illustrates a screen shot of a user-interface presented to the user. As illustrated in FIG. 7, the user may be presented with a set of thumbnail images for certain movies. These may be movies requested by the user, recommended by the system, or that meet some other criteria (e.g., new releases not previously selected by the viewer). FIG. 8 is a screen shot providing details of a selected VOD movie. FIG. 9 is a screen shot illustrating playback controls for a VOD movie. The user may select a movie, and/or be provided with, additional information, such as shown in FIG. 8. Once a movie has been selected for playing, the user may be presented with a control panel, as shown in FIG. 9.

Referring back to FIG. 3, once the Application Platform knows what movie the viewer desires, it communicates over the API to the VOD Server identifying the movie asset and the STB ID 330. In this embodiment, the Application Platform uses the EMT table to map the IP address from the user to an STB identifier. In step 335, the VOD Server tunes the STB to channel X where the selected movie may play. In step 340, the STB tunes to channel X. In step 345, the movie is streamed to the STB on channel. X.

Thus, in this manner, a cable service provider may allow various menu interfaces to be used to enhance the menu selection process to facilitate a viewer selecting a VOD program. The cable service provider is not dependent on the STB hardware, the STB VOD software, or other legacy equipment constraints for offering a flexible user interface to the user.

The Application Platform may be operated by a program distributor (e.g., the source of various thematic content, such as "food", "travel", or "home improvement" related content), the CSP, or a separate thematic website operator or business. If a program distributor is the operator, then the program distributor may maintain a library of programming that has been indexed for certain topical keywords. These types of thematic applications share a common aspect with regard to the signaling diagram of FIG. 3 for a VOD Menu Application, such that one skilled in the art would know how the signaling diagram of FIG. 3 could be adapted as detailed below.

Websites or Applications that are directed to food, including cooking, growing food, preparing food, serving food, cooking contests, etc. are well known. A cable service provider may offer a cooking-oriented web application on the Application Platform as shown in FIG. 1 or 2. Alternatively, the originator of the video programming may offer a website promoting their video programs. Either embodiment can be described using the architecture of FIG. 1 and/or 2, and the different embodiments represent in part whether the Application Platform is operated by the cable service provider or is operated by the video programming content originator.

The website may have a domain name associated with the theme, or associated with the names of the various programming. For purposes of illustration, the "Cooking" website is used generically, and does not refer to any particular domain name. The Cooking website may offer the user access to various recipes and tips for preparing certain dishes. It can also provide thumbnail images of past cooking shows or other videos related to a cooking topic. The Application allows the user to search for past cooking shows featuring certain recipes (e.g., "how to cook Peking duck"). The website may be able to determine, for example, that a user requesting a recipe for Peking duck may be interested in viewing a cooking program featuring the same or may be interested in viewing a cooking program targeted to Chinese cooking techniques. Once the user agrees to see the selected cooking' program, the application may then request the VOD Server to either play the identified video, or if the video application resides on the Application Platform (or elsewhere), inform the VOD Server as to where the video can be obtained.

In another embodiment, the Application hosted by a website may be a vacation-travel oriented application that features information about travel, destinations, resorts, foreign culture, etc. The website may interact with the user to provide information about certain destination locations. For example, the user may be researching various vacation locations in Paris, the weather in Paris at a certain time of year, and its cultural sites, including museums and cathedrals. As part of the website operation, it may provide interactive advertising regarding a vacation travel service provider as is well known in the art. The website may know of a library of videos available in its library, and recommend a particular video for the viewer based on the context. For example, since the viewer is searching for information pertaining to museums in Paris, the Application may suggest a video documentary about the Louvre museum.

Figure 4:
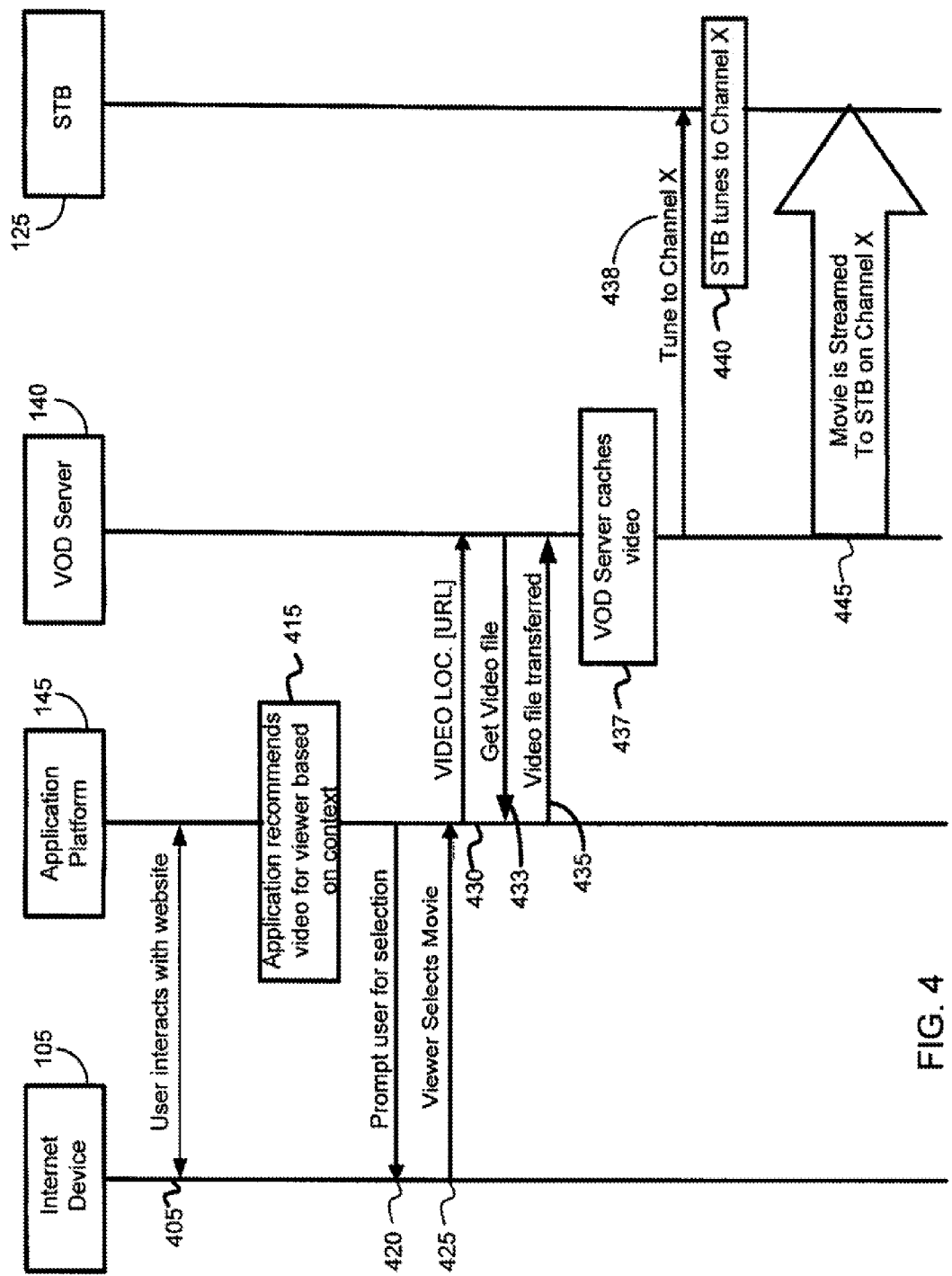
FIG. 4 is a signaling diagram illustrating communication of the components of FIG. 2 in another embodiment of the present invention.

In another embodiment, the application may function similar as shown in FIG. 3, wherein the application uses the EMT to map an IP address to a set top box address, and instruct the VOD Server to push a VOD program to that STB. FIG. 4 is a signaling diagram illustrating communication of the components of FIG. 2 in another embodiment of the present invention. In this embodiment, shown in FIG. 4, the Application Platform 145 stores the video, and informs the VOD Server how to obtain the video from the Application Platform.

Specifically, in step 405, the user interacts with the website regarding a potential travel vacation to Paris. The application is able to detect a potential interest of the user via various algorithms, and based on this recommends to the user in step 415 a particular video. The Application prompts the user in 420 for approval or selection of the video, and in step 425, the user confirms or selects the video. The Application Platform then sends a "VIDEO LOCATION" message, the purpose of which is to inform the VOD Server of a particular location (typically in the form of an URL) that should be pushed to the STB 125. In step 433, the VOD Server 140 obtains the file using conventional file transfer techniques, represented herein by a "GET Video File" message. In step 435, the video file is sent to the VOD Server. The VOD Server may cache the video in memory at step 437, and then invoke procedures to instruct the STB to tune to the indicated channel in step 438. The STB then tunes to that channel to receive the video in step 440. In step 445, the VOD Server then streams the video to the user. In this manner, the viewer is able to see a high definition video of a documentary of the Louvre. This allows the user to view the video using a larger display device (e.g., using their television as opposed to their laptop or mobile phone type communication device).

As discussed previously, the EMT table may be maintained in the Application in the web server or in the cable headend, typically in the VOD Server or a VOD management control system. The creation of the EMT refers to the process of creating a table entry for a viewer, which requires establishing the association between a STB identifier and an IP address.

The cable service provider maintains the STB identifier for a particular account in its various billing and customer services system. Thus, the CSP is aware of the STB ID (or plurality of STB IDs) associated with the viewer. Furthermore, if the cable service provider is the Internet provider, the cable service provider may also be aware of the IP address assigned to a DOCSIS modem for that viewer. However, this knowledge may be stored in a different system than the system that stores the STB ID. Alternatively, the Internet provider may not be the cable service provider, but may be a different provider, such as a wireless Internet provider.

Figure 6:
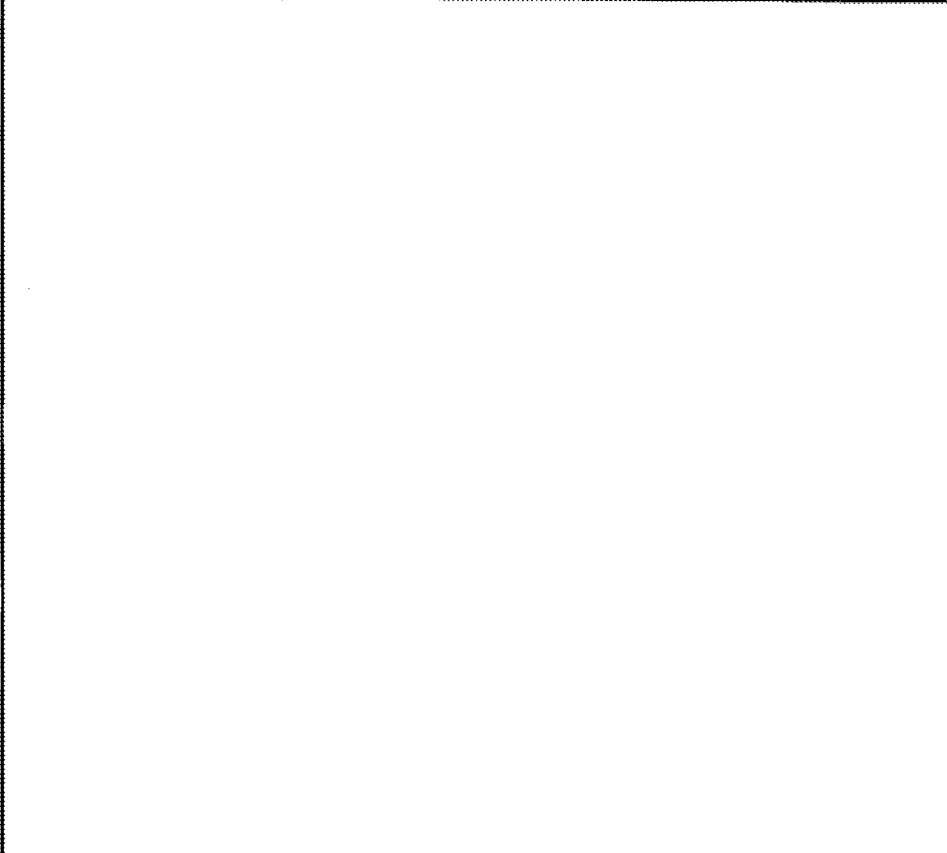
FIG. 6 is a screen shoot for entering information for the Application website in one embodiment of the present invention.

In either instance, the Application accessed by the viewer via the Internet device may be able to communicate with the cable service provider systems which stores STB ID information. In one embodiment, the information in the EMT table may be established manually at provisioning and stored in an Internet customer service billing system. In another embodiment, the user may access the Application website, and enter identifying information, such as their name and/or address. One embodiment for doing so in shown in FIG. 6. FIG. 6 is a screen shoot for entering information for the Application website in one embodiment of the present invention. If the user has previously registered, then the user may be asked to only enter a user ID and/or password for expediency. Well known techniques, such as using Internet "cookies," may allow the Application to remember such information when the user subsequently accesses the website. In this manner, the user may only have to register once with an Application, and only for subsequent visits to the Application only has to logon. The relevant viewer information can then be sent to the cable service provider, which can identify the account, and determine the STB ID. This information may be then returned to the Application, which combines this with the IP information to create the EMT table entry.

If the Application is administered by the cable service provider, then the CSP may automatically create the EMT table entry. The Application may receive the IP address when accessed by a user via the Internet access device, which it may then resolve to a MAC address, which can be resolved to an Internet service customer account. Alternatively, the IP address may be used to resolve directly to a customer account. Then, based on the Internet customer account, the Application may initiate a query to the CSP requesting the STB identifier for that user. Once the IP address and the STB ID are known by the Application for the same account, the Application may create the EMT entry for that viewer. This process is illustrated in FIG. 10.

Figure 10:
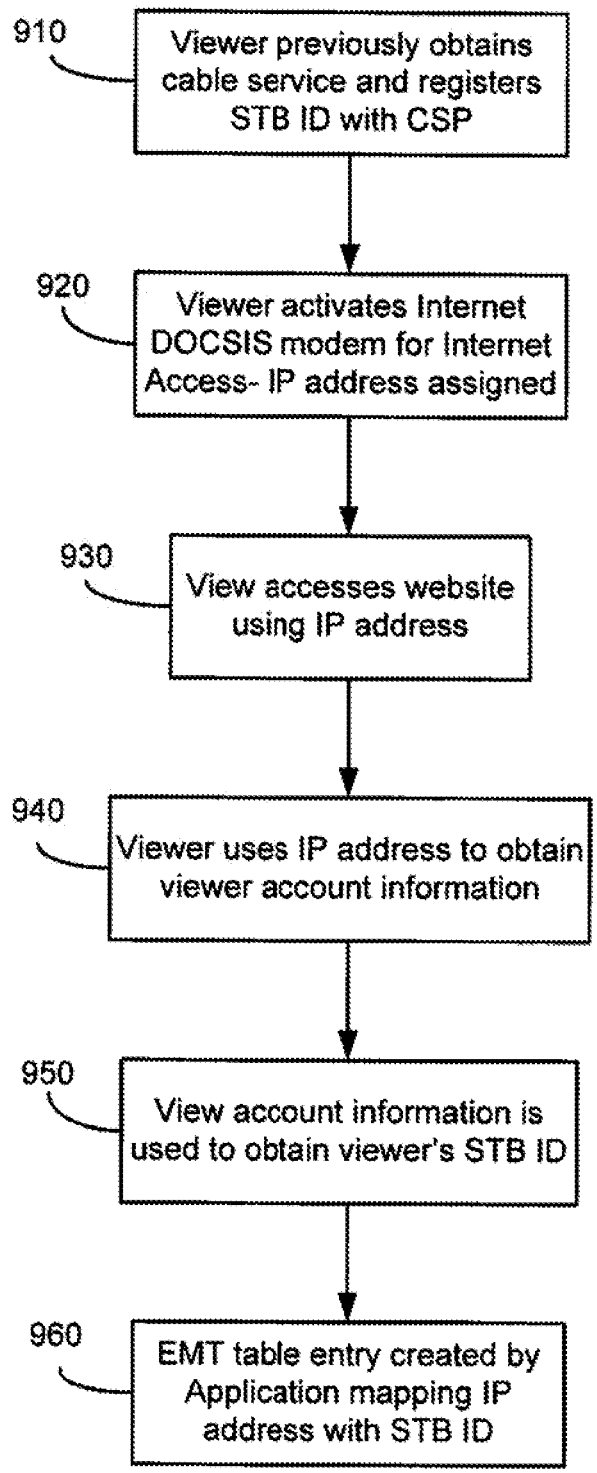
FIG. 10 is a flow chart illustrating the steps for creating the equipment-mapping table according to the teachings of the present invention.

FIG. 10 is a flowchart illustrating the steps of establishing the EMT table entry according to the teachings of the present invention. The process begins in step 910 where the user obtains Internet service for the CSP, and registers the DOCSIS cable modem with the CSP. In Step 920, the viewer uses the modem and obtains an IP address from the service provider. At this time, the service provider knows the association between the MAC address of the DOCSIS modem and the IP address. In step 930, the viewer accesses a website ("Application") which features a thematic based ability for recommending videos. The Application may obtain user information, such as name, address or other information. The viewer's information in step 950 may be used to ascertain the STB ID. Because the CSP is the Internet provider, it is able to map the IP address and the STB ID. If the user has multiple STB IDs, the Application may prompt the user to indicate which STB ID is the default value. Then, in step 960, the EMT entry is created, which associates the IP address with the STB ID. This process may be static, or may have to be updated or repeated if a new IP address or STB ID is obtained. In some situations, the viewer may have more than one STB and, thus, have multiple STB IDs associated with their residence. If only one television is ON, and the STB can detect this, then the CSP may conclude which STB ID to use. If multiple televisions are operational when the viewer accesses the Application, then the Application may prompt the viewer to enter the STB ID connecting the television they are presently using, or the CSP can select a STB ID and briefly "force tune" the STB to a channel to a predetermined image. The Application may then request the viewer verify if this event has occurred. If not, then the next STB ID can be selected, and the process repeated to verify which STB the viewer is using. Alternatively, this process may be established manually via service provisioning. Although the EMT in FIG. 5 is shown as having two columns of information, additional inforMation can be contained therein, including viewer account information, multiple STB IDs, service level indications, etc.

Figure 11:
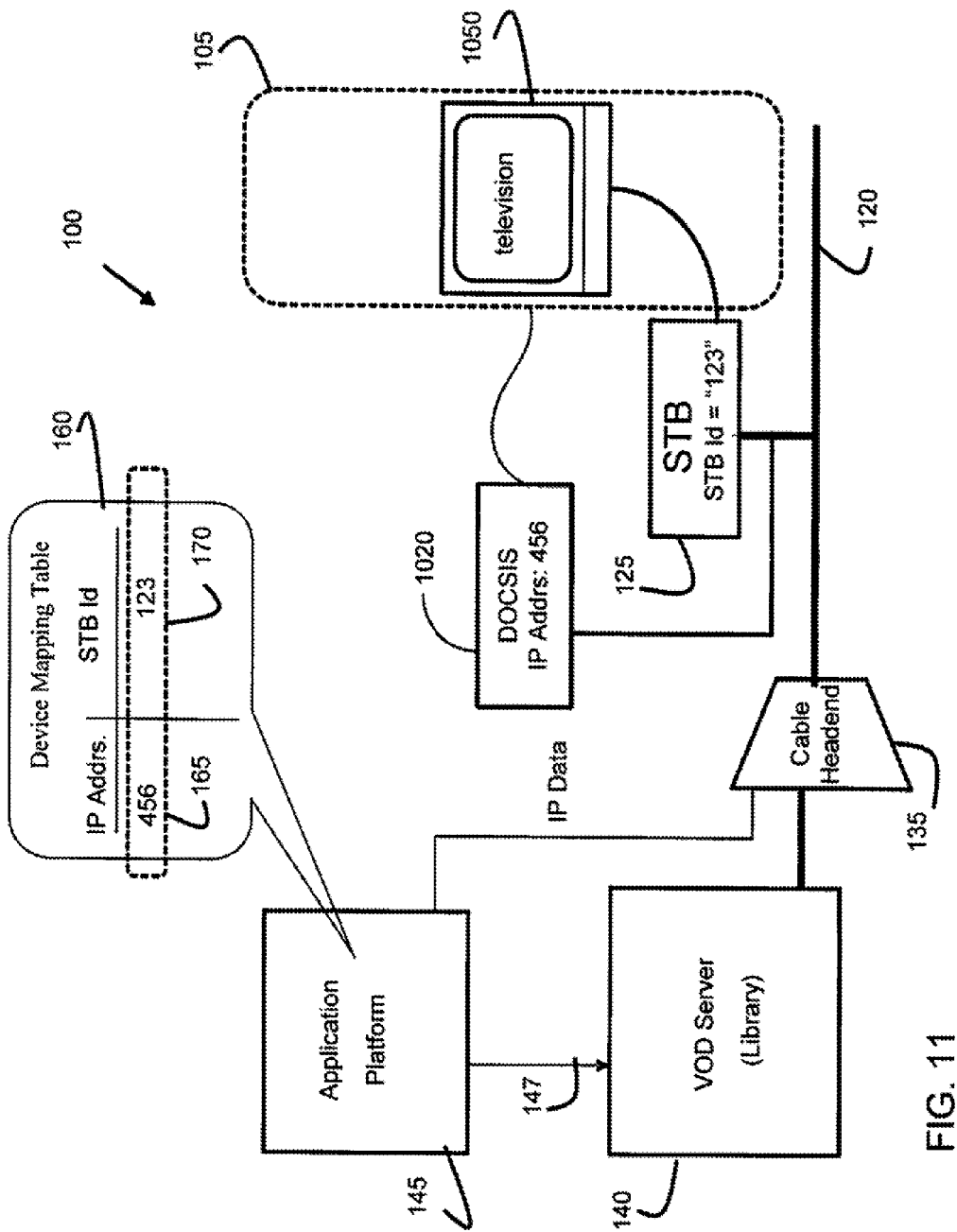
FIG. 11 illustrates a simplified block diagram of the system having a DOCSIS modem located at the viewer's premises in another embodiment of the present invention.

FIG. 11 illustrates a simplified block diagram of the system 100 having DOCSIS modem 1020 located at the viewer's premises. The DOCSIS modem is used to provide Internet access. The Internet data is separate at the cable headend and provided to the Application Platform. The Application Platform is responsible, or is able to access, the equipment that allocated the IP address. The DOCSIS modem 1020 in this embodiment is connected to an Internet enabled TV, such as TV 1050. An Internet TV is enabled for accessing the Internet, incorporating so called "widgets" which is software having browser capabilities allowing the images shown in FIG. 6-9 to be displayed on the TV 1050. The user may indicate a selection through the use of a button, input, or other selector via a remote control or wireless keyboard, or other suitable device as enabled by the TV manufacturer. In such instances, the Application may be designed with a user-interface that accommodates such input devices.

Figure 12:
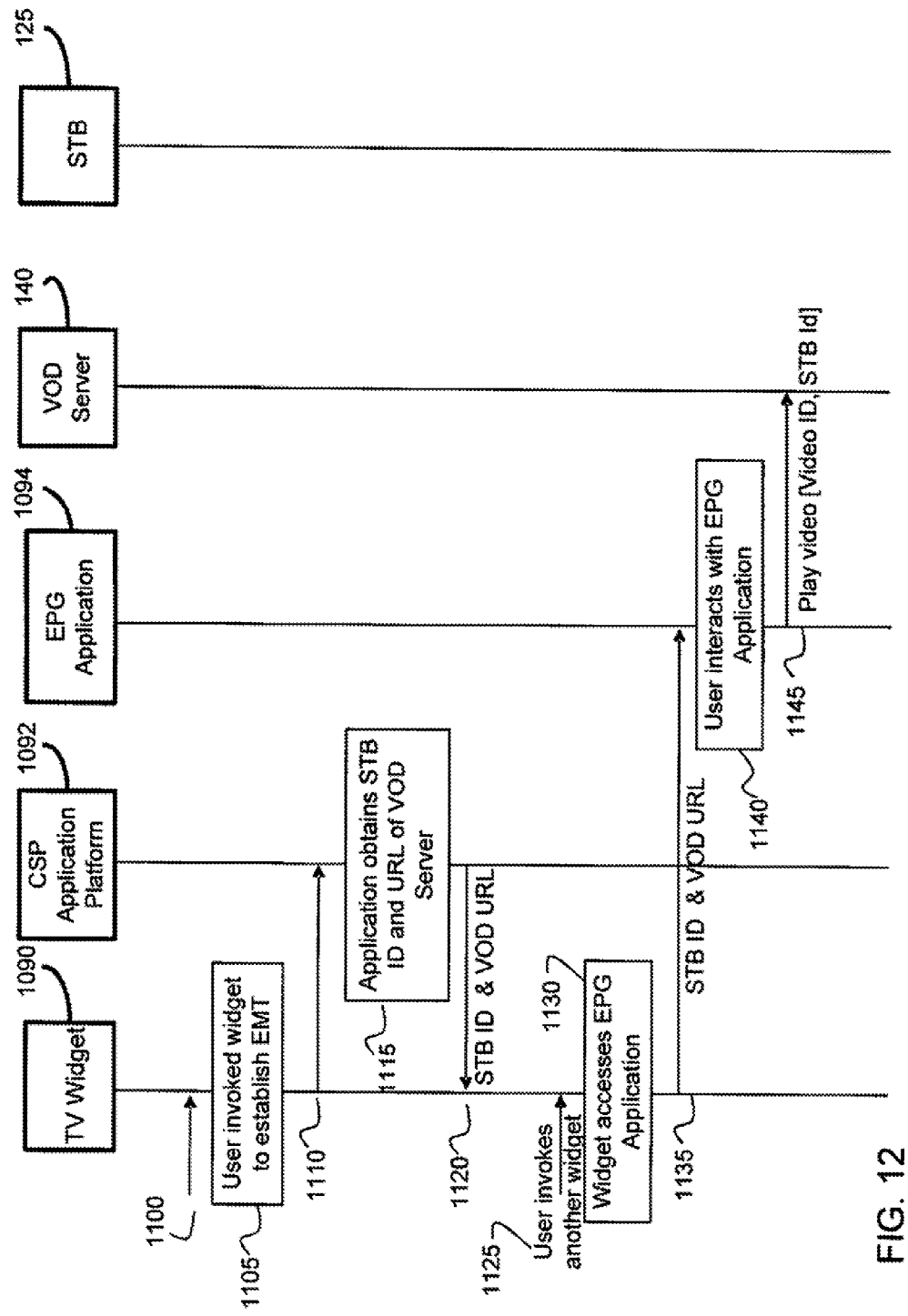
FIG. 12 is a signaling diagram illustrating the signaling messages for a widget for establishing the Equipment-Mapping Table in another embodiment of the present invention.

A "widget" on a widget enabled television allows an Internet-base client application in the television to obtain Internet related data, and display it on the television in an over-laid manner on the television images. This can be described as an Internet client application that can be executed on a TV, as opposed to a fully functional Application on a computer. The widget may be designed to have limited user-interaction, based on the user manipulating a remote control. However, the accessed server Application (residing on a website) is still not integrated with the VOD capabilities of the CSP. A widget for facilitating access by other Applications can be created, as shown in FIG. 12. This widget facilitates the establishment of the EMT table and this information can be provided to other Applications, along with the URL of the VOD Server (or a gateway to the VOD Server). FIG. 12 is a signaling diagram illustrating the signaling messages for a widget for establishing the EMT in another embodiment of the present invention.

FIG. 12 illustrates a TV widget 1090, a CSP Application Platform 1092, a Electronic Programming Guide (EPG) Application 1094, the VOD Server 140, and the STB 125. In FIG. 12, the process begins at 1100 with the user activating the widget, which can be done explicitly or implicitly. This widget may not require much viewer interaction. In 1105, the widget in the television is used to establish the EMT. In 1110, the widget is sent to the CSP Application Platform. In 1115, the Application is operated by the CSP to, verify the user, and may prompt the user to enter customer information or verify who the CSP understands the viewer to be. The Application obtains the user's STB ID either by asking the user, or accessing customer records in the CSP's system storing the STB ID. The STB ID, along with a URL of a VOD Server gateway is returned to the TV widget at 1120. This information is maintained in the TV widget for future use, and is made available to the other widgets running on the television, or it made available to Applications that request this from the television. For example, assume that at some point in time after the above widget has been executed, the user may access another widget, as occurs at 1125. This other widget may access, for example, an enhanced TV EPG Application at 1130 (such as the one previously disclosed), which accesses an Application at a website at 1135. In order for the EPG to function, the EPG Application may require, in one embodiment, the user's STB ID and VOD Server URL, so that the EPG Application may communicate with the appropriate VOD Server to play the indicated video to that viewer. In this embodiment, the STB ID and VOD URL are transmitted to the EPG application.

Alternatively, the EPG Application may request this information from the TV, which may know from invoking the widget in step 1105. Then, the STB ID and VOD Server URL may then be provided to the EPG Application. At this point, the Application knows what the originator's IP address is, what their STB ID address and the URL are for accessing that user's VOD Server. Typically the CSP will provide a gateway, as opposed to an address of the actual VOD Server. The user may interact with the EPG Application at 1140.

At 1145, various user interactions and processing by the EPG Application occur and the Application may then issue a command to the URL of the viewer's VOD Server gateway, requesting that an indicated video be played to the indicated STB. In this manner, or variations thereof, the Application is able to establish the mapping table allowing the incoming IP addresses to be associated with the viewer's STB ID, as well as the appropriate URL for sending a request to control the user's video. The Application may establish a session with the VOD Server in anticipation of requesting a video be streamed to the viewer, or contemporaneous with the request of such streaming. Various security authentication and verification procedures, such as known in the art, could be used for ensuring that only authorized Applications recognized by the VOD Server can request control for video streaming to the viewer.

Figure 13:
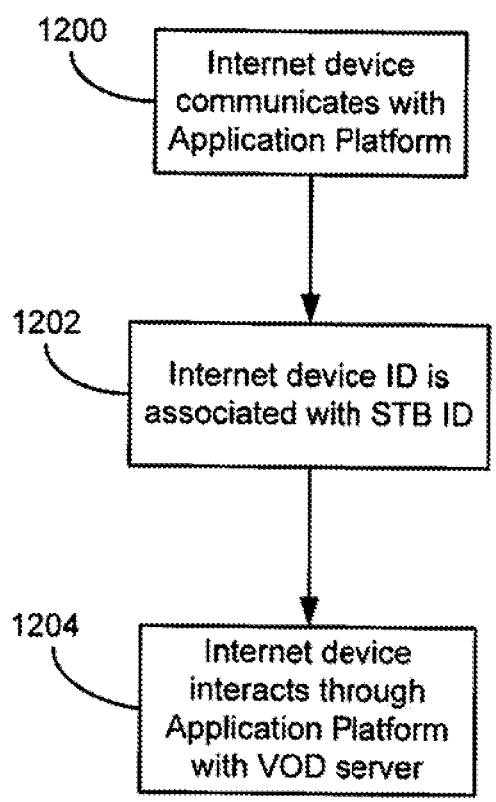
FIG. 13 is a flow chart illustrating the steps of interacting by the Internet device with the VOD Server of a cable service provider providing video services to the STB according to the teachings of the present invention.

FIG. 13 is a flow chart illustrating the steps of interacting by the Internet device 105 with the VOD Server 140 of a cable service provider providing video services to the STB 125 according to the teachings of the present invention. With reference to FIGS. 1-12, the method will now be explained. The method begins in step 1200 where, the Internet device communicates with the Application Platform 145 communicating with the VOD. Server 140. Next, in step 1202, an identifier (e.g., MAC address or IP address) of the Internet device is associated with the STB ID. This association may be accomplished by establishing an equipment-mapping table correlating an Internet Protocol (IP) address of the Internet device with the STB ID. An IP address may be allocated to the Internet device based on a MAC address from the Internet device. The MAC address may be used to determine a viewer customer account. The customer account may be used to determine the STB ID. An entry in the EMT may be created wherein the IP address of the Internet device is mapped to the STB ID. Next, in step 1204, the Internet device may interact with the Application Platform to order and control video services from the VOD server which is then provided to the STB and viewer's television.

The Application may establish a session with the VOD Server using the message shown in Table 1 below, so as to facilitate allocation of resources in the VOD Server prior to the Application requesting the streaming of a video. A list of API commands may be created between the VOD Server (or gateway to the VOD Server) and an Application as shown in Table 1. These commands disclose some of the commands/responses that may occur between the two entities for purposes of controlling the streaming of video between the CSP and the viewer.

TABLE 1

API Commands

| Command | Direction | Parameters | Function |
|---|---|---|---|
| PLAY | To VOD Server | a) video asset identifier<br>b) set top box identifier<br>c) index pointer<br>d) end pointer<br>e) URL | Instructs the VOD server to stream an identified video asset to a identified set top box. An index pointer into the asset can be identified indicating where the starting point is. An end pointer can indicated the ending point, which can be time or index based. The duration can be open ended. The list of parameters may be repeated to create a playlist. The video asset identifier can be replaced with a URL, which instructs the VOD server to play a video at a URL location which may be external to the VOD Server. |
| STOP | To VOD Server | a) video asset identifier<br>b) set top box identifier | Instructs the VOD server to terminate streaming of the video asset indicated to the identified set top box. This command indicates the video asset is not expected to be resumed - e.g., current positional counters are not maintained. |
| PAUSE | To VOD Server | a) video asset identifier<br>b) set top box identifier | Instructs the VOD server to suspend streaming of the video asset indicated to the identified set top box. This command causes positional counters to be maintained in expectation of a "RESUME" command. |
| RESUME | To VOD Server | a) video asset identifier<br>b) set top box identifier | Resumes playing of a video stream as identified. |
| SEGMENT COMPLETED | To Web Site | a) video asset identifier<br>b) set top box identifier | Informs web site of completion of streaming of identified video asset |
| SUBSCRIBER SERVICE LEVEL | To VOD Server | a) set top box identifier | Allows web site to confirm service authorization of viewer - e.g., which videos can be streamed to viewer. |
| GET VIDEO ASSET LIST | To VOD Server | | Request list of titles and associated meta data of program title that can be streamed. |
| VIDEO ASSET LIST | To Web Site | a) Titles and meta-data | Title of Assets and metadata that are available for download. |
| REQUEST STATUS | To VOD Server | a) set top box identifier | Provides status of programs being streamed to set top box. |
| STATUS RESPONSE | To Web Site | a) Active: video asset identifier, associated | Indicates whether a stream is being streamed and state information (e.g., |

TABLE 1-continued

API Commands

| Command | Direction | Parameters | Function |
|---|---|---|---|
| | | state information, etc. b) inactive | paused, actively being streamed, streamed in slow motion, etc.) |
| VIDEO LOCATION | To VOD Server | a) URL or b) URL with index | Allows the web site to inform the VOD server of the location of a video, which may not be in the VOD server. This allows the VOD Server to pre-fetch the video in anticipation of a PLAY command. |
| SESSION ESTABLISH | To VOD Server | a) STB id | Requests VOD system to establish session with Application Platform for an identified STB. |
| SESSION ESTABLISHED ACKNWLDG | To Web Site | a) STB id | The VOD Server acknowledges establishment of session, which indicates that the STB id of the viewer is known, the viewer is authorized for the services, and is able to receive VOD program. |
| SESSION ESTABLISHED DENIED | To Web Site | a) STB id b) reason code | The VOD Server cannot establish session for STB as indicated by reason code. |

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of enabling a television user to utilize an Internet device to request a Video-On-Demand (VOD) server in a television delivery system to stream a selected video to a Set Top Box (STB) of the television user, the method comprising the steps of:

establishing an Internet Protocol (IP) connection between the Internet device and an application external to the television delivery system executing at a web site external to the television delivery system, wherein the step of establishing the IP connection includes providing an Internet device identifier to the application;

the application communicating with the VOD server to obtain a listing of videos available in the television delivery system;

the application providing the Internet device with access to the listing of available videos through the IP connection;

receiving at the application from the Internet device, an indication of the selected video;

accessing by the application, an equipment-mapping table associating the Internet device identifier with an identifier of the STB of the user; and sending a request for the selected video from the application to the VOD server, the request including the identifier of the STB of the user; and wherein the Internet device is a device other than a Set Top Box (STB) that can access the Internet, delivering the selected video to the STB of the user through the television delivery system.

2. The method according to claim 1, wherein the Internet device identifier is a unique Media Access Control (MAC) address that uniquely identifies the Internet device.

3. The method according to claim 2, further comprising the step of provisioning the equipment-mapping table, the provisioning step including:

allocating an IP address to the Internet device based on the unique MAC address of the Internet device;

using the unique MAC address to determine an associated user customer account and to access customer information therein, the customer information including the STB identifier for the user; and creating an entry in the equipment-mapping table associating the IP address of the Internet device with the STB identifier.

4. The method according to claim 3, wherein the equipment-mapping table is stored in the VOD Server.

5. The method according to claim 3, wherein the equipment-mapping table is stored in an application platform.

6. The method according to claim 1, wherein the VOD server obtains the selected video from an external database, external to the VOD server.

7. The method according to claim 6, further comprising the step of the application informing the VOD server of a location of the selected video in the external database.

8. The method according to claim 1, wherein the STB of the user communicates with a television connection to the Internet, and the Internet device is located in the television.

9. An application platform at a web site external to a television delivery system for enabling a television user to utilize an Internet device to request a Video-On-Demand (VOD) server in the television delivery system to stream a selected video to a Set Top Box (STB) of the television user, the application platform comprising:

a processor and a memory;

an equipment-mapping table associating an identifier of the Internet device with an identifier of the STB of the user; and an application stored in the memory, wherein when the application is executed by the processor, the application platform performs the steps of:

establishing an Internet Protocol (IP) connection with the Internet device and obtaining the Internet device identifier;

obtaining from the VOD server, a listing of videos available in the television delivery system;

providing the Internet device with access to the listing of available videos through the IP connection;

receiving at the application from the Internet device, an indication of the selected video; and sending a request for the selected video from the application to the VOD server, the request including the identifier of the STB of the user and requesting the selected video to be delivered to the STB of the user through the television delivery system, wherein the Internet device is a device other than a Set Top Box (STB) that can access the Internet.

10. The application platform according to claim 9, wherein the Internet device identifier is a Media Access Control (MAC) address, and the application platform is configured to allocate an IP address to the Internet device based on the MAC address of the Internet device.

11. The application platform according to claim 10, wherein the equipment-mapping table includes entries that associate the IP address of the Internet device with an identifier of the STB, wherein the identifier of the STB is obtained from a user customer account identified by the MAC address of the Internet device.

12. The application platform according to claim 11, wherein the equipment-mapping table is stored in the VOD Server.

13. The application platform according to claim 11, wherein the equipment-mapping table is stored in the application platform.

14. The application platform according to claim 9, wherein the VOD server is configured to obtain the selected video from an external database, external to the VOD server.

15. The application platform according to claim 14, wherein the application is configured to inform the VOD server of a location of the selected video in the external database.

16. The application platform according to claim 9, wherein the STB of the user is in communication with a television connection to the Internet, and the Internet device is located in the television.

17. The method according to claim 1, wherein the Internet device is one of a touch-tablet computer, a laptop computer, a smart phone, and a desktop computer.

18. A system for enabling a television user to request over the Internet, a selected video to be delivered over a television delivery system, the system comprising:

a Set Top Box (STB) of the user for receiving the selected video over the television delivery system;

an Internet device other than the STB connected to the Internet at the viewer's premises, the Internet device including an Internet device identifier;

an application executing on a processor at a web site external to the television delivery system, the application in communication with the Internet device through an Internet Protocol (IP) connection;

an equipment-mapping table accessible by the application, the equipment-mapping table associating the Internet device identifier with an identifier of the STB of the user; and a Video-On-Demand (VOD) server in the television delivery system, the VOD server being in communication with the application;

wherein the Internet device includes means for sending indications of viewer inputs to the application;

wherein when the processor executes the application, the processor is caused to:

obtain the Internet device identifier through the IP connection;

obtain from the VOD server, a listing of videos available in the television delivery system, and provide the listing to the Internet device;

receive from the Internet device, an indication of the selected video;

access the equipment-mapping table with the Internet device identifier to obtain the STB identifier; and send the indication of the selected video and the STB identifier to the VOD server;

wherein the VOD server is configured to send the selected video to the STB over the television delivery system.

19. The system according to claim 18, wherein the Internet device identifier is a Media Access Control (MAC) address, and the processor is also caused to allocate an IP address to the Internet device based on the MAC address of the Internet device.

20. The system according to claim 19, wherein the equipment-mapping table includes entries that associate the IP address of the Internet device with the STB identifier, wherein the STB identifier is obtained from a user customer account identified by the MAC address of the Internet device.

21. The system according to claim 18, wherein the Internet device is one of a touch-tablet computer, a laptop computer, a smart phone, and a desktop computer.

22. The system according to claim 18, wherein the STB of the user communicates with a television connection to the Internet, and the Internet device is located in the television.

* * * * *